United States Patent
Ishikawa

(10) Patent No.: US 7,963,315 B2
(45) Date of Patent: Jun. 21, 2011

(54) VEHICLE AIR CONDITIONER HAVING HINGE FOR ROTATING HEAT EXCHANGER DURING COLLISION

(75) Inventor: Masanori Ishikawa, Hiroshima (JP)

(73) Assignee: Mazda Motor Corporation (JP)

( * ) Notice: Subject to any disclaimer, the term of this patent is extended or adjusted under 35 U.S.C. 154(b) by 1232 days.

(21) Appl. No.: 11/398,645

(22) Filed: Apr. 6, 2006

(65) Prior Publication Data

US 2006/0242979 A1    Nov. 2, 2006

(30) Foreign Application Priority Data

Apr. 28, 2005   (JP) .................................. 2005-132818

(51) Int. Cl.
B60H 1/00          (2006.01)
B60H 3/00          (2006.01)

(52) U.S. Cl. ............... 165/42; 165/41; 165/43; 165/77; 296/70; 296/187.03; 296/187.05; 180/90; 237/12.3 A; 237/12.3 B

(58) Field of Classification Search ............ 165/42, 165/43, 202, 204, 203, 77; 296/70, 187.03, 296/187.05; 62/244; 237/12.3 A, 12.3 B; 180/90
See application file for complete search history.

(56) References Cited

U.S. PATENT DOCUMENTS

| | | | |
|---|---|---|---|
| 4,437,393 A | | 3/1984 | Stolz et al. |
| 4,691,862 A | | 9/1987 | Muto et al. |
| 4,767,153 A | * | 8/1988 | Kawasaki et al. ............... 296/70 |
| 5,927,382 A | | 7/1999 | Kokubo |
| 6,101,828 A | | 8/2000 | Shikata et al. |
| 6,349,561 B1 | * | 2/2002 | Huang et al. ..................... 62/470 |
| 6,351,962 B1 | * | 3/2002 | Mizutani et al. ................ 62/244 |
| 6,820,925 B2 | * | 11/2004 | Nanaumi et al. ................ 296/70 |
| 2005/0189100 A1 | * | 9/2005 | Kawahara et al. ............. 165/202 |

FOREIGN PATENT DOCUMENTS

| | | | |
|---|---|---|---|
| DE | 19752072 A1 | * | 5/1999 |
| EP | 1 203 711 A | | 5/2002 |
| EP | 1-241 032 A | | 9/2002 |
| EP | 1717072 B1 | | 3/2009 |
| GB | 2 065 038 | | 6/1981 |
| JP | 63176715 A | * | 7/1988 |
| JP | 10071847 A | * | 3/1998 |
| JP | 10100655 A | * | 4/1998 |
| JP | 2003205765 A | * | 7/2003 |
| JP | 2005014766 A | * | 1/2005 |

OTHER PUBLICATIONS

European Search Report dated Aug. 10, 2006 Application No. EP 06 00 8211.

* cited by examiner

*Primary Examiner* — John K Ford
(74) *Attorney, Agent, or Firm* — Studebaker & Brackett PC; Donald R. Studebaker

(57) ABSTRACT

A vehicle with an air conditioner comprises an instrument panel center member disposed vertically behind an evaporator and fixed to a vehicle structure. The evaporator is disposed obliquely in such a manner that its maximum-area face has a crossing angle relative to a horizontal face and a distance between its front and rear ends is a specified length or greater. The evaporator is configured so as to be rotated between a vehicle dash panel being moved rearward and the instrument panel center member at a frontal crash of a vehicle in such a manner that the distance between its front end and rear end becomes shorter. Accordingly, the evaporator can be prevented from being pushed into a vehicle cabin at the vehicle frontal crash, thereby ensuring the safety of the passenger.

7 Claims, 5 Drawing Sheets

VEHICLE AIR CONDITIONER HAVING HINGE FOR ROTATING HEAT EXCHANGER DURING COLLISION

BACKGROUND OF THE INVENTION

The present invention relates to a vehicle with an air conditioner, particularly to a vehicle with an air conditioner, in which the air conditioner uses high-pressure gas, such as carbon dioxide, as coolant, that can prevent a heat exchanger from being pushed into a vehicle cabin at a vehicle frontal crash.

Conventionally, the heat exchanger of the air conditioner for a vehicle is formed in a substantially flat and rectangular-parallelepiped shape and thereby it has a relatively great rigidity in a direction parallel to its maximum-area face. The air conditioner with such heat exchanger is generally disposed near an instrument panel of the vehicle. In this case, when a vehicle frontal crash (front face crash or front offset crash) occurs, a power train including an engine, an exhaust manifold and so on is forced to move rearward. Thereby, there is a concern that the heat exchanger would be pushed back into a vehicle cabin without being deformed and contact a passenger in the vehicle cabin. Accordingly, some measures to prevent this situation have been required.

U.S. Pat. No. 5,927,382 discloses the cooling unit of the air conditioner for an automotive vehicle, in which the evaporator is disposed obliquely relative to the vehicle longitudinal direction in the cooling unit. Herein, groove portions are formed at the case of the cooling unit. When at the vehicle frontal crash, knees of a passenger seated in an assistant's seat hit against the groove portions, the case is broken and the evaporator is rotated by the crash impact so as to be located in parallel to the vehicle width direction. Thereby, the cooling unit is prevented from contacting the passenger further.

Meanwhile, in a case where the high-pressure gas, such as carbon dioxide, is used as the coolant, a pressure of 5 Mpa or greater acts on supply pipes and the heat exchanger of the air conditioner in its normal operation state. Therefore, such supply pipes and heat exchanger are generally made of steel materials with high rigidity, and coupling forces for them are also set to be properly strong. In the cooling unit of the air conditioner of the above-described patent document, the heat exchanger is formed of multilayer tubes that are made of metal film plates, such as aluminum film plates, and the heat exchanger is configured so as to be rotated by the passenger's knees hitting against the case. Herein, if the above-described cooing unit was applied to the air conditioner using the high-pressure gas, there would be concern that the heat exchanger could not be rotated properly because the supply pipes and heat exchanger themselves and their coupling forces are made relatively strong, as described above.

SUMMARY OF THE INVENTION

The present invention has been devised in view of the above-described problem, and an object of the present invention is to provide a vehicle with an air conditioner using high-pressure gas, such as carbon dioxide, as coolant, that can prevent the heat exchanger from being pushed into the vehicle cabin at the vehicle frontal crash, thereby ensuring the safety of the passenger.

According to the present invention, there is provided a vehicle with an air conditioner, in which the air conditioner comprises a heat exchanger formed in a substantially flat and rectangular-parallelepiped shape, uses high-pressure gas in an evaporated state as coolant, and is disposed near an instrument panel of the vehicle, comprising a reinforcement member provided behind the heat exchanger so as to extend vertically or in a vehicle width direction and be fixed to a vehicle structure, wherein the heat exchanger is disposed obliquely in such a manner that a maximum-area face thereof has a specified crossing angle relative to a horizontal face or a vertical face extending the vehicle width direction and a distance between front and rear ends thereof is a specified length or greater, and the heat exchanger is configured so as to be rotated at a vehicle frontal crash between a vehicle dash panel being moved rearward and the reinforcement member in such a manner that the distance between its front end and rear end becomes shorter.

According to the present invention, at the vehicle frontal crash, the heat exchanger is prevented from being moved rearward by the reinforcement member, and the heat exchanger is rotated such that the distance of the front and rear ends of the heat exchanger becomes shorter. Thereby, the heat exchanger can be prevented properly from being pushed into the vehicle cabin, thereby ensuring the safety of the passenger.

According to an embodiment of the present, invention, the reinforcement member comprises a pair of members that are provided behind the heat exchanger so as to extend vertically, and the heat exchanger is disposed in such a manner that an angle formed between its maximum-area face and the reinforcement member is configured to be an acute angle. Thereby, the heat exchanger can be rotated surely at the vehicle frontal crash.

According to another embodiment of the present invention, the heat exchanger comprises an evaporator, and the heat exchanger is disposed in such a manner that an angle formed between its maximum-area face and a vertical face extending in a vehicle vertical direction is configured to be other than approximately 20-40 degrees. Thereby, some water produced by dew condensation at peripheries of the heat exchanger can be made drop from the heat exchanger surely, and thus deterioration of the cooling function of the heat exchanger can be prevented.

According to another embodiment of the present invention, an upper end of the reinforcement member is fixed to an instrument panel member of the vehicle that supports a steering member and extends in the vehicle width direction. Thereby, a crash impact conveyed from the heat exchanger to the heat exchanger can be properly absorbed by the rotation of the heat exchanger, and the reinforcement member, instrument panel member and steering member can be prevented properly from being moved rearward, thereby further ensuring the safety of passenger.

According to another embodiment of the present invention, a supply pipe made of steel is coupled to a front end portion of the heat exchanger, and the supply pipe is disposed so as to be moved rearward to promote a rotation of the heat exchanger at the vehicle frontal crash. Thereby, the heat exchanger can be rotated surely by the rearward movement of the supply pipe.

According to another embodiment of the present invention, a power train of the vehicle is disposed in front of the supply pipe. Thereby, the supply pipe can be moved rearward surely by the rearward movement of the power train, thereby rotating the heat exchanger properly.

According to another embodiment of the present invention, there is provided at least at a front end or a rear end of the heat exchanger a rotation promotion member to promote a rotation of the heat exchanger. Thereby, the rotation of the heat exchanger can be promoted by the rotation promotion member.

According to another embodiment of the present invention, a heater core that has a smaller mass than the heat exchanger is provided within an area of the rotation of the heat exchanger, and the heater core is configured so as to be deformed and movable by contact with the heat exchanger. Thereby, the heater can allow the rotation of the heat exchanger properly.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Figure 1:
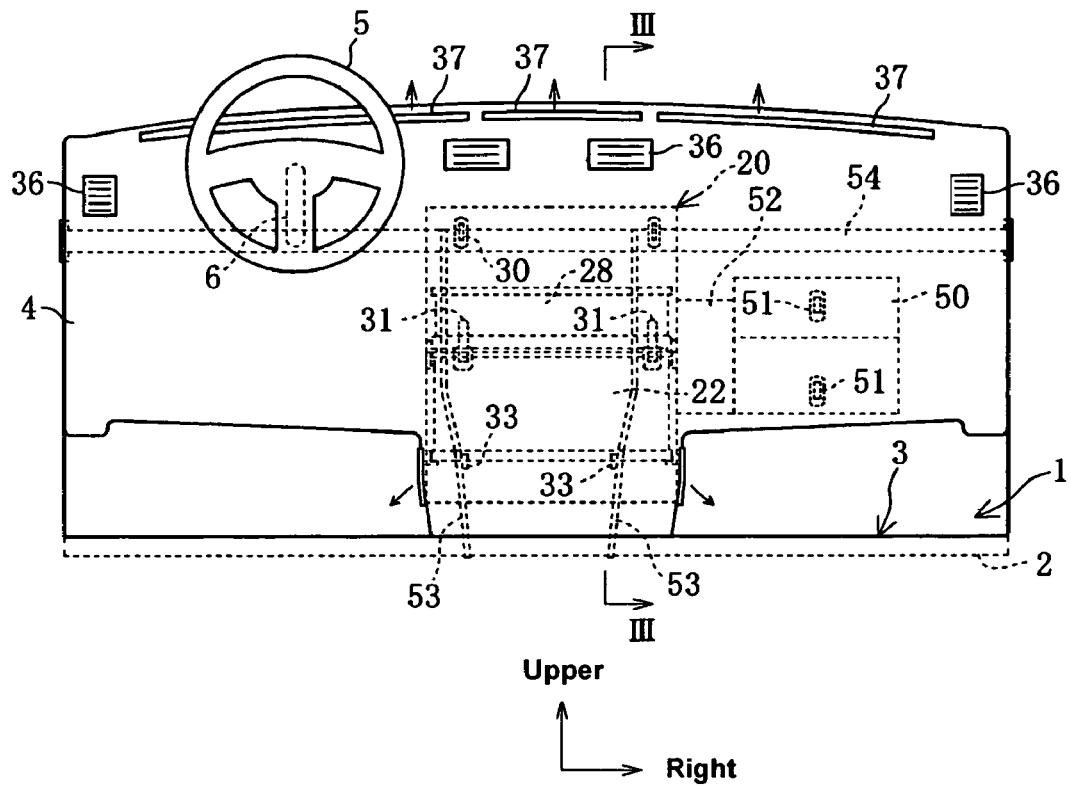
FIG. 1 is a plan view of a portion at an instrument panel of a vehicle equipped with an air conditioner unit according to an embodiment of the present invention.

As shown in FIG. 1, an air conditioner is installed in a vehicle C, in which a steering wheel 5 is provided at the left of an instrument panel 4. In FIG. 1, the upper portion of the figure is an upper side of the vehicle C and the right portion of the figure is a right side of the vehicle C.

Figure 2:
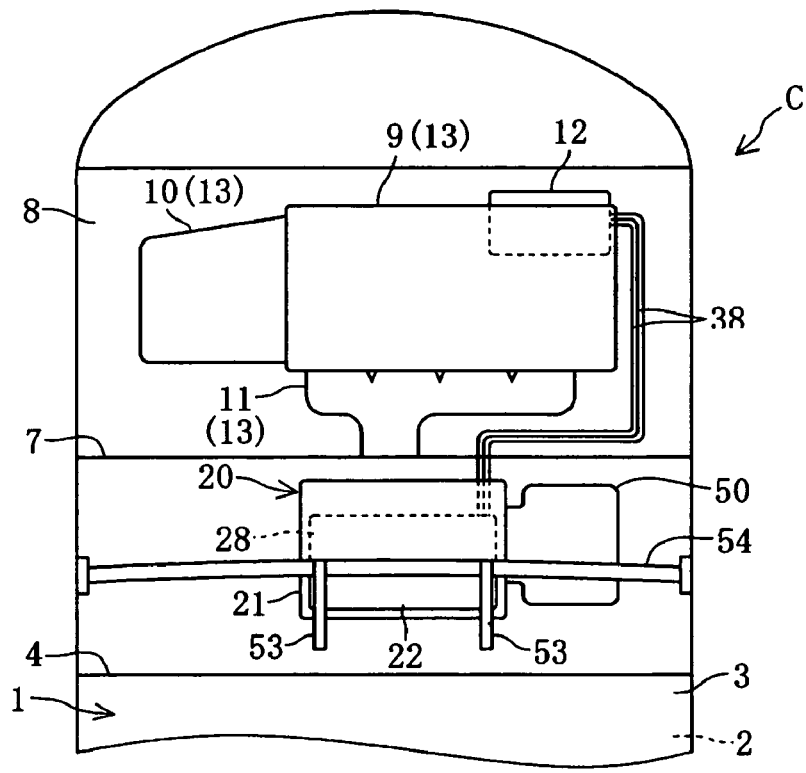
FIG. 2 is an opened-up plan view of a front portion of the vehicle.
Figure 3:
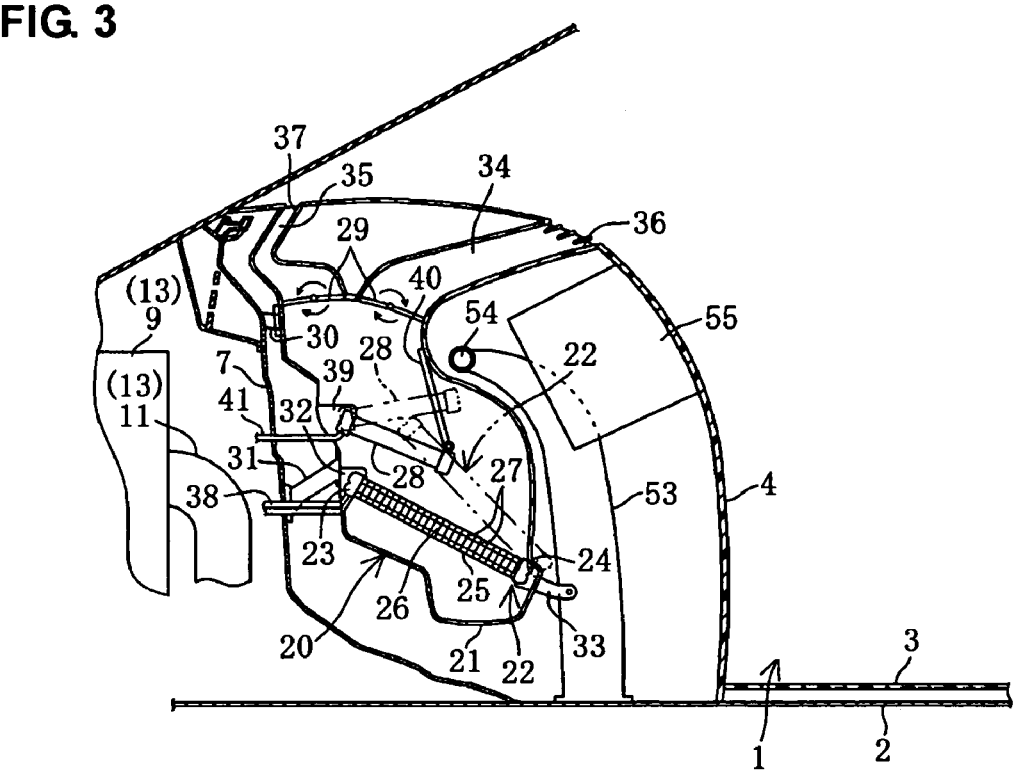
FIG. 3 is a sectional view taken along line III-III of FIG. 2.

As shown in FIGS. 1 and 3, a floor panel 2 that is made of steel is provided in a vehicle cabin 1, and a floor trim 3 that is made of synthetic resins is placed on most part of the floor panel 2. At a front side in the vehicle cabin 1 is provided the instrument panel 4, and the steering wheel 5 (steering member) is located at the left side of the instrument panel 4. A dash panel 7 is provided in front of the instrument panel 4, and an engine room 8 is provided in front of the dash panel 7 (see FIG. 2).

Next, a structure of a power train 13 that is disposed in the engine room 8 will be described. There are provided an engine 9, a transmission 10, an exhaust manifold 11, a compressor 12 and so on in the engine room 8 of the vehicle C. The transmission 10 is disposed on the left side of the engine 9, and the exhaust manifold 11 that is made of metal is disposed behind the engine 9.

Below the engine 9 is provided the compressor 12 to compress and supply coolant (carbon dioxide) to an evaporator 22, which will be described below. Each end of two pipes 38 is coupled to the compressor 12 and each other end of the pipes 38 is connected to the evaporator 22. Part of these pipes 38 are disposed so as to extend in a vehicle width direction behind the engine 9 and the exhaust manifold 11. That is, the engine 9 and the exhaust manifold 11 are located in front of part of the pipes 38 that extend in the vehicle width direction. Herein, the engine 9, exhaust manifold 11, and transmission 10 forms the power train 13 together.

Between the dash panel 7 and the instrument panel 4, as shown in FIGS. 1 and 3, are provided an air conditioner unit 20 (air conditioner) having cooling and heating function, a blower unit 50, a control unit 52, an instrument panel center member 53, an instrument panel member 54, an audio unit 55 and so on. A conditioning air fed from the air conditioner unit 20 is blown out of plural outlet ports 36, 37 that are formed at the instrument panel 4.

On the right side of the air conditioner unit 20 is provided the blower unit 50 that is supported by a support bracket 51, and between the air conditioner unit 20 and the blower unit 50 is provided the control unit 52 to control these units 20, 50. In front of the audio unit 55, the instrument panel member 54 to support the steering wheel 5 via the steering shaft 6 is disposed laterally in the vehicle width direction, and both ends thereof are fixed to a vehicle body structure. Behind the air conditioner unit 20 and at a substantially center portion of the vehicle (that is, between a driver's seat and an assistant's seat) are provided a pair of instrument panel center members 53 that extend vertically and are connected to a vehicle body structure at their lower ends and to the instrument panel member 54 at their upper ends. Each of the instrument panel center members 53, which is formed in a thick-plate shape, comprises an arc-shaped curve portion (upper portion) that slants along a back face of the air conditioner unit 20, and a straight portion that extends following this curve portion (lower portion).

Next, the air conditioner unit 20 will be described. As shown in FIGS. 1-3, the air conditioner unit 20 is disposed between the dash panel 7 and the instrument panel center members 53 inside the instrument panel 4. The air conditioner unit 20 comprises a plastic case 21, the evaporator 22 that is the heat exchanger operative to cool the conditioning air with the cooling function of evaporation of the liquid coolant, a heater core 28 operative to heat the conditioning air with heated water after the engine cooling, an adjusting valve 29 operative to adjust the amount of conditioning air, and so on.

A front side of the case 21 is connected to the dash panel 7 at its upper and middle portions via steel support brackets 30, 31. These brackets 30, 31 are comprised of a pair of members, respectively, and the members are located separately from each other at both sides in the vehicle width direction, so as to connect the above-described case 21 to the dash panel 7 at these portions, respectively. Meanwhile, there are provided steel support brackets 33, which are comprised of a pair of members likewise, behind the case 21, Each of the brackets 33 penetrates the case 21 at its lower portion so as to support the air conditioner unit 20 at the instrument panel center members 53. At the upper of the air conditioner unit 20 are provided a couple of air conditioning passages 34, 35, which lead to the outlet ports 36, 37, respectively. Also, at the upper of the air conditioner unit 20 are provided a couple of adjusting valves 29, which are disposed respectively in the passages 34, 35 at their lower ends and operative to adjust the amount of conditioning air supplied to the outlet ports 36, 37.

Next, the evaporator 22 will be described. The evaporator 22 is made of metal (for example, a light alloy such as aluminum, or steel) and formed in a flat and rectangular-parallelepiped shape as shown in FIG. 3, and it cools the conditioning air by means of an evaporation heat of the liquid coolant with a low temperature and a low pressure that has been compressed by the compressor 12. The evaporator 22 includes an upper tank 23, a lower tank 24, pipes 26, and fins 27. The upper tank 23 is disposed at a front end portion of the evaporator 22, and the lower tank 24 is disposed at a lower end portion of the evaporator 22. The pipes 26, in which the coolant flows, extend in the evaporator 22, and the fins 27 are provided so as to extend in the vehicle width direction.

A front end of the evaporator 22 is supported at a support member 32 provided at an inner wall of the case 21, while a rear end of the evaporator 22 is supported at a support bracket 33 fixed to the instrument panel center members 53. The evaporator 22 is disposed obliquely in such a manner that a distance between its front end and rear end is a specified length or greater. Specifically, an angle formed between the maximum-area face of the evaporator 22 and a vertical face extending in a vehicle vertical direction is approximately 60 degrees (other than approximately 20-40 degrees) and an angle formed between the maximum-area face of the evaporator 22 and the instrument panel center members 53 is also approximately 60 degrees (acute angle).

The evaporator 22 is supported so as to rotate clockwise in FIG. 3 around its rear end at the frontal crash of the vehicle C, and the support rigidity of the support bracket 33 supporting the rear end of the evaporator 22 is set to be greater than that of the support bracket 33 supporting the front end of the evaporator 22. If the support bracket 33 is broken, the evaporator 22 can be supported by the instrument panel center members 53. Herein, it is preferable that the length of the evaporator in the vehicle direction is longer than the distance of the two instrument panel center members 53.

Two supply pipes 38 which are made of metal (e.g., steel) are coupled to a front end portion of the evaporator 22, passing through the dash panel 7. Rear end portions of these supply pipes 38 are bent upward obliquely and their front end portions extend forward horizontally. The supply pipes 38 are coupled to the lower end portion of the evaporator 22, and when the frontal crash of the vehicle C happens, the supply pipes 38 are moved rearward to promote the above-described rotation of the evaporator 22.

Next, the heater core 28 will be described. The heater core 28 is disposed above and in parallel to the evaporator 22 as shown in FIG. 3. The heater core 28 is made of aluminum and formed in the flat and rectangular-parallelepiped shape, having about half scale of the evaporator 22. A front end of the heater core 28 is supported at a support member 39 that is provided at the inner wall of the case 21, and its rear end is disposed at a specified location such that an aerodynamics damper 40 (opening valve), whose pivotal axis is located at the rear end of the heater core 28 and which is able to swing longitudinally, can substantially cover the upper face of the heater core 28. Both side ends of the heater core 28 are supported at the inner wall of the case 21. Herein, the support rigidity of the heater core 38 at the support member 39 is set to be greater than that of the heater core 38 at the above-described both sides or at a attaching portion of the pivotal axis of the damper 40. Thereby, the heater core 28 is configured so as to be easy to rotate vertically around the support member 39 at the vehicle frontal crash.

Thus, when at the frontal crash of the vehicle C the evaporator 22 rotates and the upper tank 23 of the evaporator 22 contacts the lower face of the heater core 28, the heater core 28 rotates counterclockwise in FIG. 3 around the support member 39. To the front end of the heater core 28 are coupled supply pipes 41, which are made of aluminum and whose other ends are coupled to the engine 9, passing through the dash panel 7. The cooling water that is heated at the engine 9 is supplied to the heater core 28 via these pipes 41.

Next, the operation and effects of the vehicle C with the above-described air conditioner unit 20 will be described. At the frontal crash of the vehicle C, the power train 13 hits against the laterally-extending portion of the supply pipes 38 and the dash panel 7, and thereby the pipes 38 and the dash panel 7 are moved rearward. As a consequence, the evaporator 22 is rotated clockwise, by being pushed up between the dash panel 7 and the instrument panel center members 53, as shown by two-dotted broken lines in FIG. 3. Herein, the instrument panel center members 53 prevent properly the evaporator 22 from further moving rearward, and thereby promotes the clockwise rotation of the evaporator 22. Accordingly, the evaporator 22 can be prevented from being pushed into the vehicle cabin 1, thereby ensuring a safety of passengers.

Further, the instrument panel center members 53 are provided behind the evaporator 22, extending vertically, and the angle formed between the maximum-area face of the evaporator 22 and the instrument panel center members 53 is set to be the acute angle. Accordingly, the evaporator 22 can be rotated surely at the frontal crash of the vehicle C. Also, the upper ends of the instrument panel center members 53 are fixed to the instrument member 54 extending in the vehicle width direction to support the steering wheel 5. Accordingly, the crash impact can be properly absorbed by the rotation of the evaporator 22 and the instrument panel 54 and the steering wheel 5 that are supported at the instrument panel center members 53 can be also prevented properly from being moved rearward, thereby further ensuring the safety of passengers.

Further, the steel supply pipes 38 are coupled to the front end portion of the evaporator 22 and these pipes 38 are provided so as to promote the rotation of the evaporator 22 with a rearward movement thereof at the vehicle frontal crash. The rotation of the evaporator 22 can be attained surely with the supply pipes 38 moving rearward. Herein, the power train 13 is disposed before the supply pipes 38, so the rearward movement of the power train 13 at the vehicle frontal crash can surely cause the above-described rearward movement of the supply pipes 38. Also, within an area of the rotation of the evaporator 22 is provided the heater core 28 that is small sized compared with the evaporator 22. Accordingly, the rotation of the evaporator 22 would not be prevented by the existence of the heater core 28.

Further, the evaporator 22 is disposed in such a manner that the angle formed between the maximum-area face of the evaporator 22 and the vertical face is other than approximately 20-40 degrees. Accordingly, some water produced by dew condensation at peripheries of the pipes 26 and fins 27 can be made drop from the evaporator surely, and thereby the deterioration of the cooling function of the evaporator 22 can be prevented. Also, the evaporator 22 is disposed obliquely and the conditioning air flows passing through the evaporator 22 from the bottom to the upper, so the longitudinal length of the air conditioner unit 20 is made short and the flow resistance can be reduced and the air flow efficiency can be improved as well.

Next, modified embodiments will be described.

Figure 4:
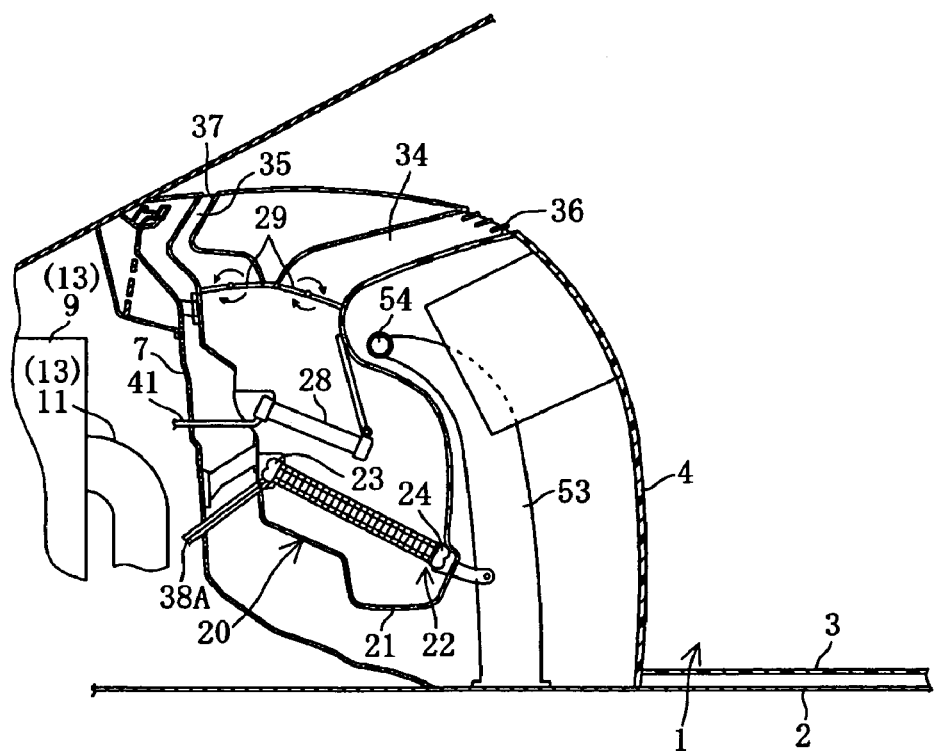
FIG. 4 is a view of a modified embodiment, corresponding to FIG. 3.
Figure 5:
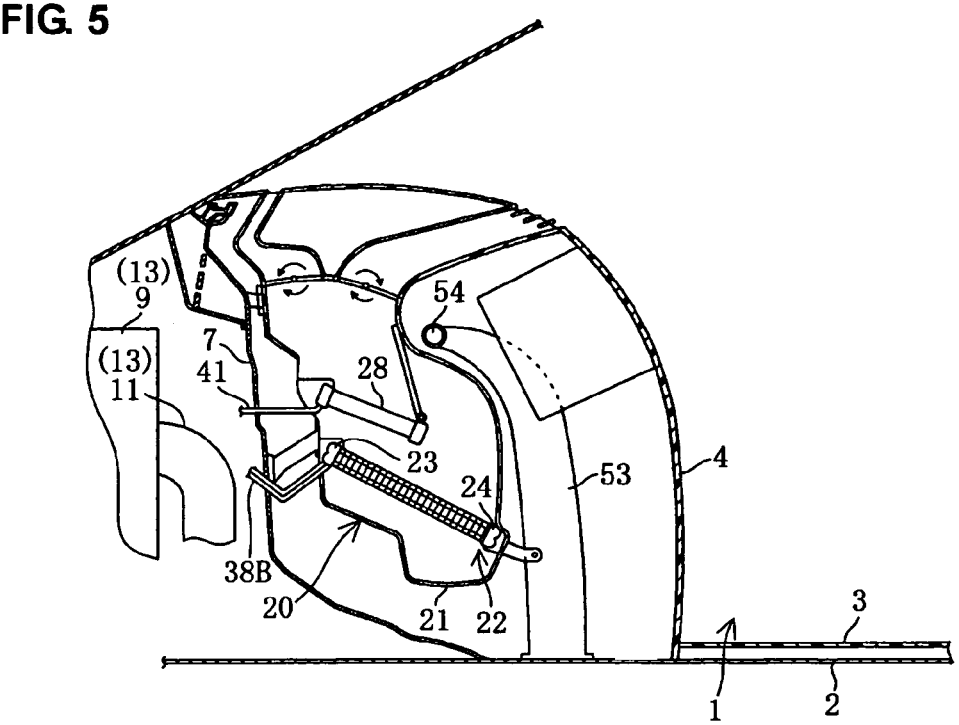
FIG. 5 is a view of another modified embodiment, corresponding to FIG. 3.

1) As long as the supply pipes 38 are coupled to the lower end of the upper tank 23 from the front and below so as to promote the rotation of the evaporator 22 at the vehicle frontal crash as described above, their extending shape should not be limited to the above-described embodiment. That is, the supply pipes may be formed in a straight shape like supplies pipes 38A shown in FIG. 4 or in a V-shaped bent form like supplies pipes 38B shown in FIG. 5.

Figure 6:
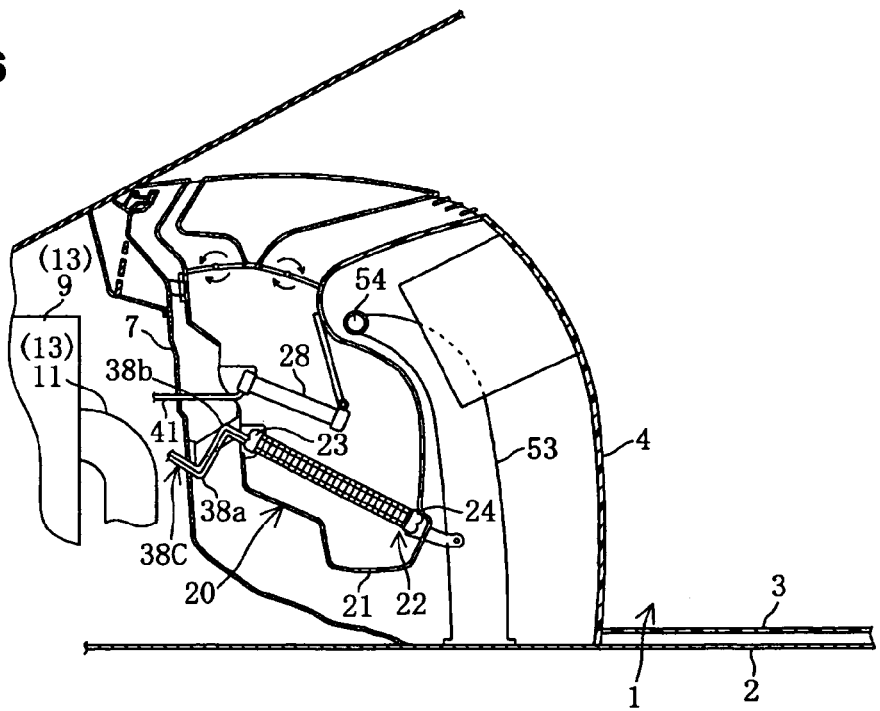
FIG. 6 is a view of another modified embodiment, corresponding to FIG. 3.

2) Also, the supply pipes may be comprised of supplies pipes 38C shown in FIG. 6, which comprises a first bent portion 38a with a downward-bent V shape and a second bent portion 38b with a upward-bent reverse-V shape, and whose rear ends are coupled to a top face (front end face) of the upper tank 23.

Figure 7:
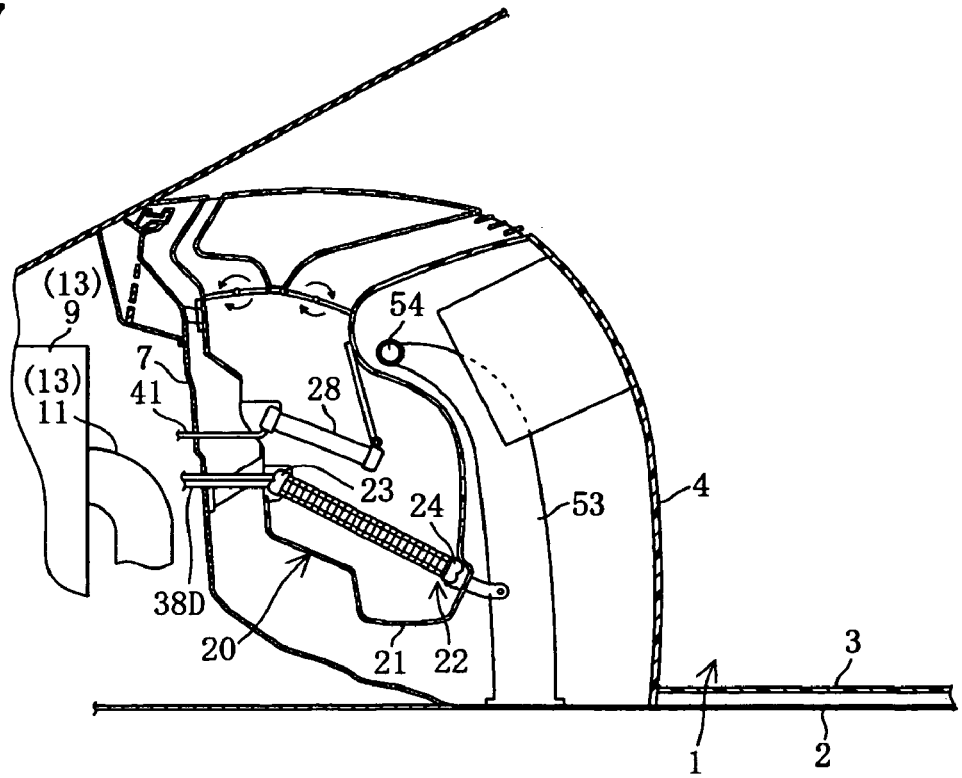
FIG. 7 is a view of another modified embodiment, corresponding to FIG. 3.
Figure 8:
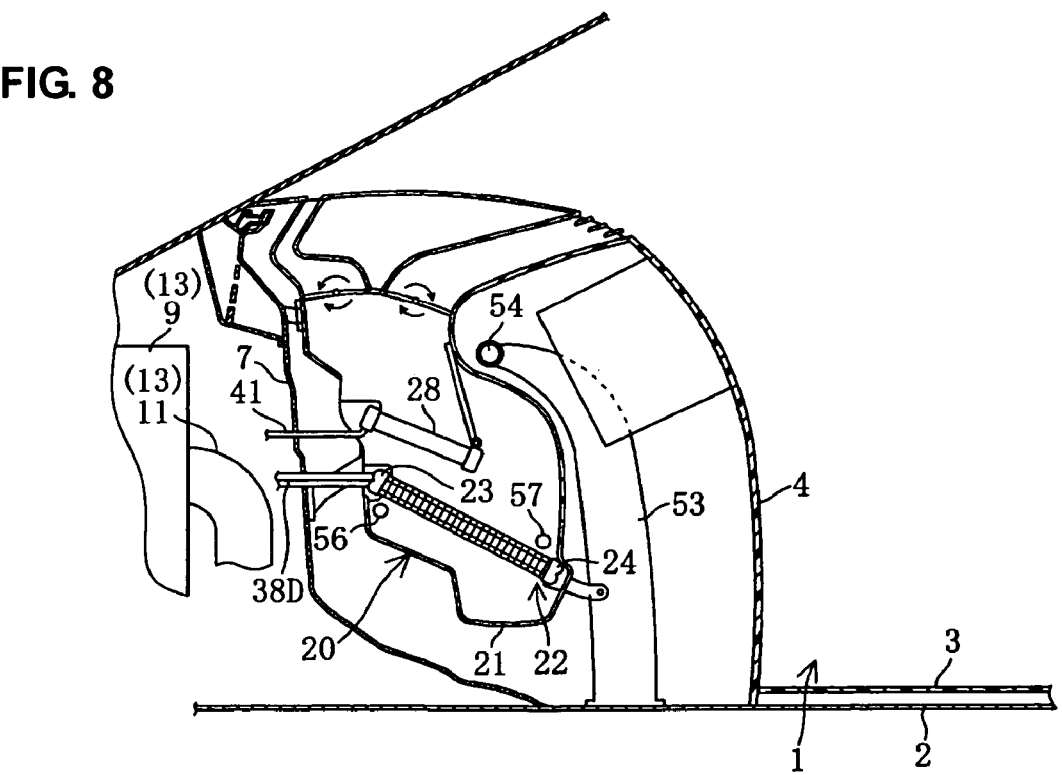
FIG. 8 is a view of another modified embodiment, corresponding to FIG. 3.

3) Also, the supply pipes may be comprised of supply pipes 38D shown in FIG. 7, whose rear ends are coupled to the top of the upper tank 23 with an acute angle formed between the supply pipes 38D and the top face (front end face) of the upper tank 23.

4) There may be also provided rotation promotion axes 56, 57 (corresponding to a rotation promotion member) that are respectively located right below the front end of the evaporator 22 and right above the rear end of the evaporator 22, being fixed to either the dash panel 7, the floor panel 2, the inner wall of the case 21, or the instrument panel center members 53. In this case, at the frontal crash of the vehicle C the downward movement (rotation) of the front end of the evaporator 22 is prevented by the rotation promotion axis 56, while the rotation promotion axis 57 functions as the rotational center of the evaporator 22, so that the clockwise rotation of the evaporator 22 can be promoted. Herein, the shape or inclination angle of the supply pipes are not be limited.

5) Although in the above-described embodiments the support rigidity of the heater core 28 at the support member 39 is set to be greater than that of the heater core 28 at the both sides and at the attaching portion of the pivotal axis of the aerodynamics damper 40, these support rigidity may be set to be substantially the same. In this case, since the pipe thickness of the aluminum heater core 28 is formed to be thicker than that of the aluminum evaporator 22, the heater core 28 is formed with a smaller mass and a compact size. Accordingly, the lower side of the heater core 28 can be deformed properly, thereby allowing the rotation of the evaporator 22 in an appropriate manner.

Figure 9:
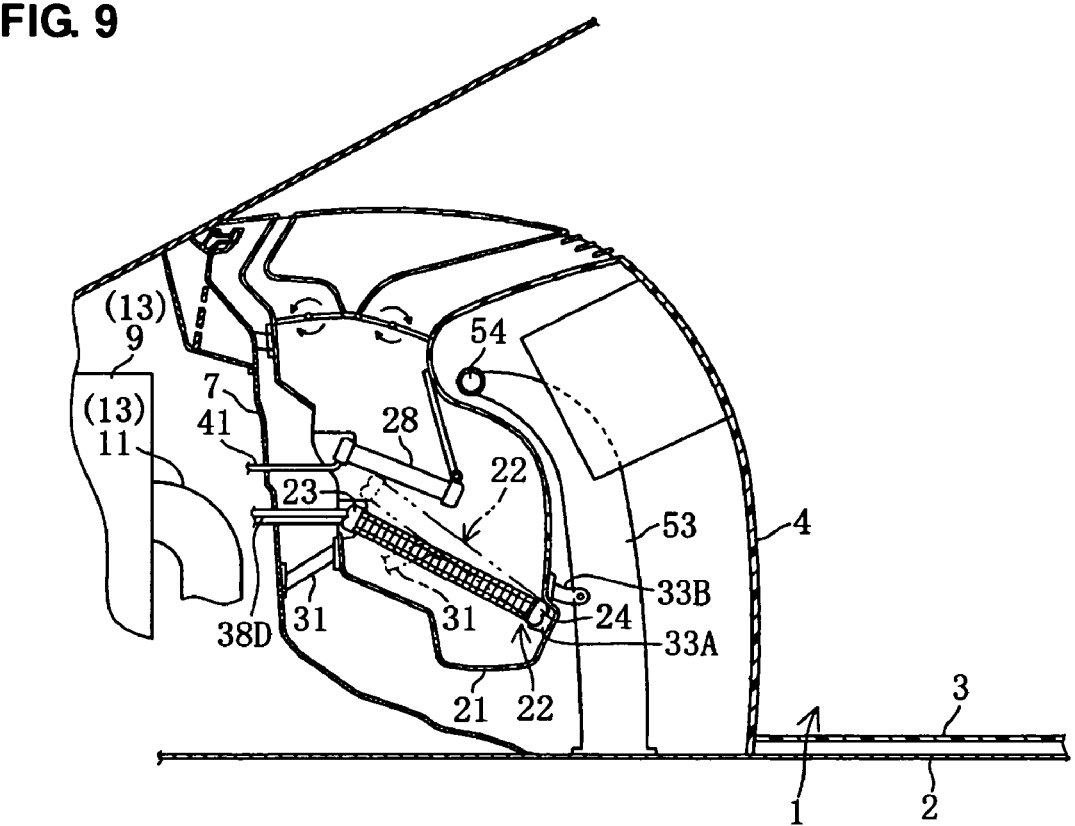
FIG. 9 is a view of another modified embodiment, corresponding to FIG. 3.

6) As shown in FIG. 9, a support member 33A to support the rear end of the evaporator 22 may be provided at the inner face of the case 21, and the air conditioner unit 20 may be supported by the support bracket 31, which is positioned below the front end of the evaporator 22, and a support bracket 33B, which is provided at a location above the rear end of the evaporator 22. In this case, at the frontal crash of the vehicle C the downward movement (rotation) of the front end of the evaporator 22 is prevented by the support bracket 31, while the support bracket 33B functions as the rotational center of the evaporator 22, so that the clockwise rotation of the evaporator 22 can be promoted as shown in FIG. 9.

Figure 10:
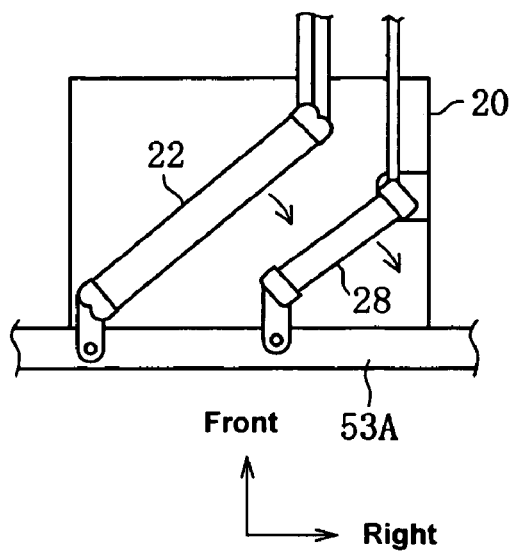
FIG. 10 is a plan view of an evaporator and an instrument panel of another modified embodiment.

7) In the above-described embodiments, the instrument panel center members 53 is disposed vertically and the evaporator 22 and heater core 28 are disposed obliquely relative to the horizontal face. Instead, as shown in FIG. 10, there may be provided a second instrument panel member 53A that is fixed to the vehicle body so as to extend in the vehicle width direction behind the air conditioner unit 20, in which the evaporator 22 and heater core 28 are disposed obliquely relative to the vertical face. In this case, at the frontal crash of the vehicle C the evaporator 22 is rotated clockwise in FIG. 10 in such a manner that the distance between its front end and rear end becomes shorter. Accordingly, the evaporator 22 can be prevented from being pushed into the vehicle cabin 1, thereby ensuring the safety of passengers.

8) The present invention should not be limited to the above-described embodiments, but any other modifications and improvements may be applied within the scope of a sprit of the present invention.

What is claimed is:

1. A vehicle with an air conditioner, comprising:
   a heat exchanger of the air conditioner disposed between a vehicle dash panel and an instrument panel of the vehicle;
   an instrument panel member supporting a steering member of the vehicle so as to extend in a vehicle width direction; and
   a reinforcement member, having an upper end and a lower end, provided behind the heat exchanger in a vehicle longitudinal direction so as to extend vertically, the upper end of which is fixed to the instrument panel member and the lower end of which is fixed to a lower vehicle structure,
   wherein the heat exchanger has a rear end and a front end and is disposed obliquely such that a maximum-area face thereof has a specified crossing angle relative to a vertical face extending in a vehicle vertical direction, the front end of the heat exchanger is supported at the dash panel via a support member, and the rear end of the heat exchanger is supported at the reinforcement member via a support hinged bracket which is located below the level of the support member, whereby the heat exchanger is rotatable around the rear end with the front end thereof moving upward in a vehicle frontal crash between the vehicle dash panel being moved rearward and said reinforcement member such that the distance between the front end and the rear end of the heat exchanger becomes shorter in the vehicle longitudinal direction.

2. The vehicle with an air conditioner of claim 1, wherein said reinforcement member comprises a pair of members provided behind the heat exchanger so as to extend vertically, and the heat exchanger is disposed such that an angle formed between its maximum-area face and said reinforcement member is an acute angle.

3. The vehicle with an air conditioner of claim 2, wherein the heat exchanger comprises an evaporator, and the heat exchanger is disposed such that an angle formed between its maximum-area face and the vertical face extending in the vehicle vertical direction is other than 20-40 degrees.

4. The vehicle with an air conditioner of claim 1, wherein a supply pipe made of steel is coupled to a front end portion of the heat exchanger, and the supply pipe is disposed so as to be moved rearward to promote a rotation of the heat exchanger at the vehicle frontal crash.

5. The vehicle with an air conditioner of claim 4, wherein a power train of the vehicle is disposed in front of said supply pipe.

6. The vehicle with an air conditioner of claim 1, wherein there is further provided near at least one of the front end and the rear end of the heat exchanger a rotation promotion axis member to promote a rotation of the heat exchanger.

7. The vehicle with an air conditioner of claim 1, wherein a heater core that has a smaller mass than the heat exchanger is provided within an area of the rotation of the heat exchanger, and the heater core is deformable and movable by contact with the heat exchanger.

* * * * *